United States Patent

Sado

Patent Number: 5,367,405
Date of Patent: Nov. 22, 1994

[54] PROJECTING LENS

[75] Inventor: Kenzo Sado, Saitama, Japan

[73] Assignee: Fuji Photo Optical Co., Ltd., Saitama, Japan

[21] Appl. No.: 31,527

[22] Filed: Mar. 15, 1993

[30] Foreign Application Priority Data

Feb. 16, 1993 [JP] Japan .................... 5-26797

[51] Int. Cl.⁵ .............................................. G02B 13/18
[52] U.S. Cl. ..................................... 359/649; 359/708
[58] Field of Search .............. 359/715, 708, 649, 650

[56] References Cited

U.S. PATENT DOCUMENTS

| | | | |
|---|---|---|---|
| 4,900,139 | 2/1990 | Kreitzer | 359/649 |
| 5,048,940 | 9/1991 | Ueda et al. | 359/649 |
| 5,130,850 | 7/1992 | Toide | 359/649 |
| 5,212,597 | 5/1993 | Yamada | 359/649 |

*Primary Examiner*—Scott J. Sugarman
*Attorney, Agent, or Firm*—Brumbaugh, Graves, Donohue & Raymond

[57] ABSTRACT

First, second, third, and fourth set lenses are located in this order from the direction of a screen. The first lens group comprises a plastic lens having a weak refracting power and at least one aspherical surface. The second lens group comprises a plastic lens having a weak refracting power and at least one aspherical surface, and an achromatic lens system having a substantial effect on the refracting power of the whole projecting lens. The achromatic lens system is composed of three or four glass lenses, and a plastic lens having a positive refracting power and at least one aspherical surface. The third lens group comprises a plastic lens having a weak refracting power and at least one aspherical surface. The fourth lens group comprises a plastic lens having at least one aspherical surface, and a field flattener lens, which is located with its concave surface facing the screen and which constitutes a liquid optical coupler. Special conditions are satisfied such that an unsharp state of a projected image due to an increase in temperature may be compensated for, and a wide variable power range may be obtained.

6 Claims, 10 Drawing Sheets

SPHERICAL ABERRATION      ASTIGMATISM

SPHERICAL ABERRATION
F/1.2

FIG. 7A m=-1/0.044

ASTIGMATISM
θ=-25.7

SPHERICAL ABERRATION        ASTIGMATISM

SPHERICAL ABERRATION

ASTIGMATISM

SPHERICAL ABERRATION

ASTIGMATISM

PROJECTING LENS

BACKGROUND OF THE INVENTION

1. Field of the Invention

This invention relates to a projecting lens for use in a projection television wherein an image formed on a projection cathode-ray tube (CRT), or the like, is projected onto a large-sized screen. This invention particularly relates to an optical coupling type (OC type) of projecting lens, wherein a liquid is filled between a lens and a CRT in order to keep the contrast ratio high and to keep the CRT cooling efficiency high.

2. Description of the Prior Art

Projection televisions are provided with a projecting lens for projecting an image, which has been formed on a CRT surface, or the like, onto a large-sized screen. Recently, projection televisions are widely used in theaters, exhibition halls, airplanes, and the like.

As the projecting lens for projection televisions, it is desirable that an OC type of projecting lens be used which has a good cooling efficiency and a good contrast ratio.

Projection televisions are also used as terminals for projecting images obtained from VTR's, images obtained from video cameras, images which the televisions have received, computer graphic images, and the like. Recently, the projection televisions are required to have an increasingly higher resolution.

As the OC type of projecting lens which is considered to provide images of a high resolution, a projecting lens disclosed in U.S. Pat. No. 4,900,139 has heretofore been known.

Projection televisions can be classified into a front screen type and a rear screen type.

In the cases of the rear screen type of projection television, the distance between a screen and a projecting lens is set by a rear projection box when the projection television is delivered to users. On the other hand, in the cases of the front screen type of projection television, the distance between a screen and a projecting lens is set by the user. Therefore, the front screen type of projection television should satisfy the requirement that the distance between the screen and the projecting lens can be varied over a wide range (i.e., that the variable power range can be kept wide).

However, with the projecting lens disclosed in U.S. Pat. No. 4,900,139, as shown in Table 1, Table 4, Table 5, and Table 8 in its specification, the magnification range is respectively 16.42, from 10.70 to 12.03, from 10.00 to 10.59, and from 8.13 to 10.87. Specifically, the variable power range is 1.34 times at the most. On the other hand, with an air coupling type of projecting lens, which is illustrated as a comparative example in U.S. Pat. No. 4,900,139, the magnifications range from 10 to 60, and therefore the variable power range is 6 times. The variable power range of the disclosed projecting lens is very much narrower than that of the air coupling type of projecting lens.

As described above, with the aforesaid conventional technique which is known as the OC type of projecting lens capable of forming an image with a high resolution, the variable power range is narrow. The reasons for the above are that, if the variable power range is kept wider, a field flattener lens (i.e., a concave lens which has a large center thickness and is combined integrally with a CRT surface with a liquid sealed therebetween) and the other projecting lens elements cannot be moved together along the optical axis direction. Therefore, the distance between the field flattener lens and the other projecting lens elements changes largely, and the image quality at the peripheral regions and the center region of an image area becomes worse as the magnification goes beyond a reference magnification. Even if measures, such as insertion of a floating lens, are employed, it will be difficult to compensate for the bad image quality.

Accordingly, in cases where the conventional technique is employed as a projecting lens for a projection television, particularly for a front screen type of projection television, the problems occur in that the variable power range cannot be kept wide and it is necessary for several kinds of projecting lenses to be prepared in accordance with, for example, different screen sizes.

Also, with the aforesaid OC type of projecting lens, the temperature of the liquid sealed between the field flattener lens and the CRT surface becomes very high due to heat from the CRT surface, and therefore the lens housing expands. As a result, the position at which the projecting lens is mounted varies, and the projected image becomes unsharp.

In order to compensate for the unsharp state of the projected image, it will be efficient that plastic lenses exhibiting a large variation in the refractive index due to an increase in the temperature are utilized positively. However, the problems have heretofore been encountered in that the conditions, under which the plastic lenses should compensate for the unsharp projected image, and the conditions for widening the variable power range do not match with each other. Therefore, it often occurs that, under certain conditions, an increase in the effects of compensation for the unsharp state of the unsharp projected image results in a narrower variable power range.

SUMMARY OF THE INVENTION

The primary object of the present invention is to provide an optical coupling type of projecting lens, wherein an unsharp state of a projected image due to an increase in the temperature is accurately compensated for, and a variable power range of at least approximately 6 times is obtained even if the projecting lens is applied to a front screen type of projection television.

Another object of the present invention is to provide an optical coupling type of projecting lens, which forms a projected image having a high resolution.

The present invention provides a projecting lens constituted of four sets of lenses for projecting an image, which has been formed on a projection cathode-ray tube, onto a screen, the projecting lens comprising:
  i) a first lens group including a positive plastic lens having a weak refracting power, at least one surface of which lens is aspherical,
  ii) a second lens group constituted of:
    a) a plastic lens having a weak refracting power, at least one surface of which lens is aspherical, and
    b) an achromatic lens system having a substantial effect on the refracting power of the whole projecting lens, the achromatic lens system being composed of three or four glass lenses, and a plastic lens having a positive refracting power, which lens is aspherical or at least one surface of which lens is aspherical,
  said plastic lens having the weak refracting power and said achromatic lens in said second lens group being located in this order from the direction of the screen, iii) a third lens group constituted of a plastic lens having a weak refracting power, at least one surface of which lens is aspherical, and iv) a fourth lens group including a plastic lens, at least one surface of which is aspherical, and a field flattener lens, which is located such that its concave surface faces the screen, said plastic lens and said field flattener lens in said fourth lens group, being located in this order from the direction of the screen, said first lens group, said second lens group, said third lens group, and said fourth lens group being located in this order from the side of the screen, said field flattener lens including a liquid optical coupler, which contains a liquid sealed between said field flattener lens and the projection cathode-ray tube, the condition being satisfied, which is expressed as $$LC/FO > 0.47$$

wherein LC represents the distance between the surface of said plastic lens of said third lens group, which faces the projection cathode-ray tube, and a fluorescent surface of the projection cathode-ray tube, and FO represents the focal length of the whole projecting lens, when the magnification of the projecting lens is varied, said first lens group, said second lens group, and said third lens group being moved different distances so as to adjust a focusing position, the condition being satisfied, which is expressed as $$0.1 < \phi T/\phi O < 0.5$$

wherein $\phi T$ represents the refracting power of said plastic lens having the positive refracting power, which lens constitutes said second lens group, and $\phi O$ represents the refracting power of the whole projecting lens.

The term "weak refracting power" as used herein means a refracting power which is weaker than the refracting power of the achromatic lens system and which does not very much affect the refracting power of the whole projecting lens.

Also, the term "having a substantial effect on the refracting power of the whole projecting lens" as used herein means that achromatic lens system has a refracting power at least or approximately one half the refracting power of the whole projecting lens.

As described above, in the case of the OC type of projecting lens, when the magnification is varied over a wide range, the image quality at the peripheral regions and the center region of an image area becomes worse. With the projecting lens in accordance with the present invention, the adjustment of the focusing position and the variation of the magnification are effected by the second lens group, which has the majority of the refracting power of the whole projecting lens. At this time, the bad image quality at the peripheral regions of the image area is compensated for by changing the distance between the first lens group and the second lens group. Also, the bad image quality at the center region of the image area is compensated for by the third lens group.

The light beam, the image of which is formed at the center region of the image area, is approximately collimated at the location of the first lens group. Therefore, even if the first lens group moves, little effects will occur on the image quality at the center region of the image area.

At the location of the third lens group, the light beam, the image of which is formed at the center region of the image area, is divergent. Therefore, by the movement of the third lens group, the image quality at the center region of the image area can be corrected efficiently. However, if the third lens group comes close to the projection cathode-ray tube, its ability to correct the image quality at the center region of the image area will become small. This is the reason why the above-described condition LC/FO>0.47 should be satisfied.

When the third lens group moves, the focusing position shifts from the correct position due to a change in the spherical aberration. Therefore, during the operation for moving the second lens group and the third lens group, the relationship between the position of the second lens group and the position of the third lens group should preferably set to be a predetermined relationship in accordance with their movements.

The first lens group has a weak refracting power such that little effect on its image quality at the center region of the image area may occur due to the movement and such that the correction of the image quality may be carried out efficiently.

The plastic lens, which is located closest to the screen among the lenses of the second lens group, has a weak refracting power such that the effects of the environmental conditions, such as the temperature and humidity, on a change in the refractive index of the plastic lens may be canceled by such effects on a change in the refractive index of the first lens group.

In order for the chromatic aberration to be compensated for such that the high resolution conditions may be satisfied, the achromatic lens system of the second lens group should preferably be constituted of a combination of convex, concave, convex, and convex lenses, which are located in this order from the direction of the screen. Alternatively, the achromatic lens system of the second lens group should preferably be constituted of a combination of concave, convex, concave, convex, and convex lenses, which are located in this order from the direction of the screen. As another alternative, the achromatic lens system of the second lens group should preferably be constituted of a combination of concave, convex, convex, and convex lenses, which are located in this order from the direction of the screen.

The lens elements constituting the OC type of projecting lens include the field flattener lens, the temperature of which easily becomes high. Therefore, when the temperature of the field flattener lens increases, a liquid housing and a lens barrel mounted on the liquid housing elongate markedly, and the refractive index of the liquid decreases markedly.

With a conventional high resolution lens, in which most of the refracting power of the lens is given by glass lenses, the elongation due to an increase in the temperature could not be compensated for, and the resolution inevitably decreased. Therefore, with the conventional high resolution lens, a high resolution could not be obtained.

With the projecting lens in accordance with the present invention, the lens, which is remotest from the screen among the lenses constituting the second lens group, is constituted of the plastic lens, which undergoes a large change in the refractive index due to an increase in the temperature. This plastic lens is imparted with a large refracting power, and a shift in the focusing position due to an increase in the temperature is thereby reliably compensated for.

The temperature compensation can be carried out with a smaller refracting power when the lens for effecting the temperature compensation is located at a position, at which the increase in the temperature is comparatively large. From this point of view, it will be convenient that the lens for effecting the temperature compensation is located at a position as closer to the field flattener lens as possible. However, the effects of the field flattener lens are achieved by a strong negative refracting power. Therefore, if the lens having a positive refracting power is located close to the field flattener lens, the effects of the field flattener lens will become small. Also, the positive refracting power in the vicinity of the field flattener lens will have little contribution to the required refracting power of the whole projecting lens. On the contrary, in cases where the lens for effecting the temperature compensation is located in the second lens group, the refracting power of the lens is added to the refracting power of the second lens group. Therefore, the positive refracting power for the temperature compensation in the second lens group can serve as part of the refracting power of the whole projecting lens and is thus efficient.

Also, at the location of the lens for effecting the temperature compensation in the second lens group, a change accompanying an increase in the temperature acts in the same manner both for the center region and the peripheral regions of the image area. Therefore, the performance after the temperature compensation has been effected can be kept stable.

If the plastic lens of the first lens group or the third lens group is imparted with a positive refracting power in order to effect the compensation, a change in the performance due to variation in the magnification will become large. In such cases, even if the distance between the adjacent sets of lenses is varied, it will be difficult to compensate for the performance.

With the projecting lens in accordance with the present invention, the condition $0.1 < \phi T/\phi O < 0.5$ is set. The reasons for this is that, when the value of $\phi T/\phi O$ falls within the specified range, it is possible to compensate for the unsharp state of the projected image due to an increase in the temperature. If the value of $\phi T/\phi O$ is not larger than 0.1 or is not smaller than 0.5, the compensation will become deficient or excessive, and the appropriate effects of compensation cannot be obtained.

As described above, with the projecting lens in accordance with the present invention, the first lens group, the second lens group, and the third lens group can be moved different distances. A large variation in the magnification is enabled primarily by the movement of the second lens group. Also, the image quality of the projected image becoming bad at the peripheral regions of the image area due to the variation in the magnification is compensated for by changing the distance between the first lens group and the second lens group. The image quality of the projected image becoming bad at the center region of the image area due to the variation in the magnification is compensated for by the movement of the third lens group.

In this manner, a wide variable power range can be obtained such that the image quality of the projected image may not become worse. Even if the projecting lens in accordance with the present invention is applied to a projecting lens in a front screen type of projection television, a variable power range of approximately 6 times or more can be obtained.

Also, with the projecting lens in accordance with the present invention, the lens, which is located closest to the direction of the projection cathode-ray tube among the lenses constituting the second lens group, is constituted of the plastic lens, and this plastic lens is imparted with an appropriately large refracting power. In this manner, the position and the refracting power of the plastic lens are adjusted appropriately. Therefore, by the utilization of the characteristics of the plastic lens in that its refractive index changes largely when the temperature increases, a change in the focusing distance due to an increase in the temperature of the field flattener lens can be compensated for. Additionally, it is possible to eliminate the problems in that the variable power range is caused to become narrow by the plastic lens.

DESCRIPTION OF THE PREFERRED EMBODIMENTS

The present invention will hereinbelow be described in further detail with reference to the accompanying drawings.

In the embodiments described below, the symbols used in the accompanying drawings and the tables have the meanings defined below.

f: Focal length of the projecting lens
F: F-number
m: Magnification
r1, r2, ..., rn: Radii of curvature of the surfaces of respective lenses and the face plate
d1, d2, ..., dn: Axial air and liquid separations or thicknesses of respective lenses and the face plate
ne: Refractive indices of respective lenses with respect to the e-line νd: Abbe's dispersion numbers of respective lenses with respect to the d-line z: Optical axis An aspherical surface is represented by "*". When the optical axis direction is taken as the z axis, and y is the semi-aperture distance from the axis z, the shape of the aspherical surface is expressed as $$Z = \frac{Cy^2}{1 + \sqrt{1 - (1 + k)C^2y^2}} + a_1y^4 + a_2y^6 + a_3y^8 + a_4y^{10}$$

wherein C represents the vertex curvature (the reciprocal of the radius of curvature), k represents the eccentricity, and a1, a2, a3, and a4 represent the aspherical surface factors.

FIRST EMBODIMENT

Figure 1:
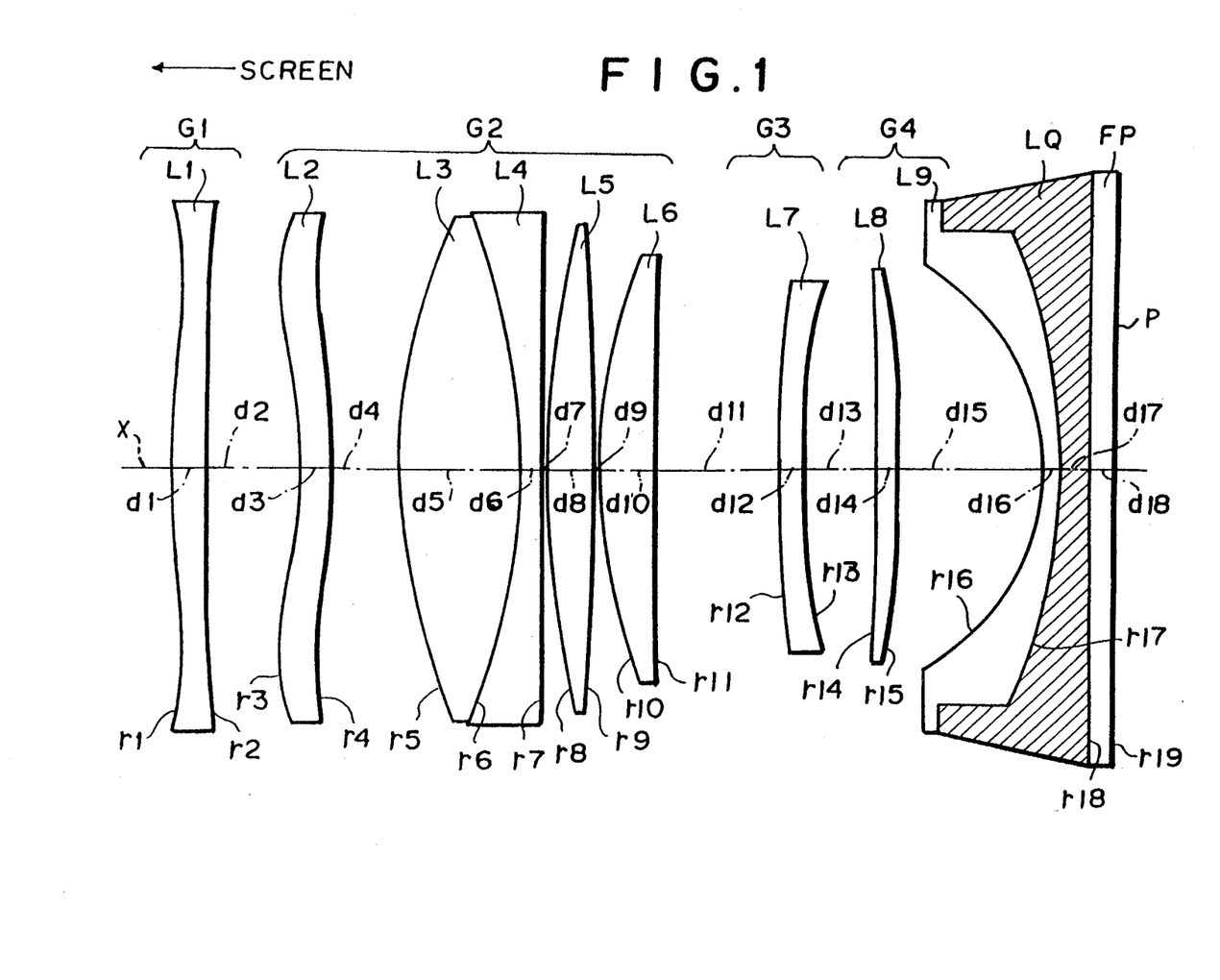
FIG. 1 is a sectional view showing a first embodiment of the projecting lens in accordance with the present invention.

The first embodiment of the projecting lens in accordance with the present invention, which is shown in FIG. 1, comprises a first lens group G1, a second lens group G2, a third lens group G3, and a fourth lens group G4, which are located in this order from the direction of a screen. The first lens group G1 is constituted of a plastic lens L1 having a weak refracting power. The two surfaces of the plastic lens L1 are aspherical. The second lens group G2 is constituted of a plastic lens L2 having a weak refracting power, the two surfaces of which lens are aspherical, and four lenses L3, L4, L5, and L6, which constitute an achromatic lens system having the majority of the refracting power of the whole projecting lens. The lens L6 is a positive meniscus lens located such that its convex surface faces the screen. The plastic lens L2, the lenses L3, L4, and L5, and the positive meniscus lens L6, which constitute the second lens group G2, are located in this order from the direction of the screen. The third lens group G3 is constituted of a plastic lens L7 having a weak refracting power. The two surfaces of the plastic lens L7 are aspherical. The fourth lens group G4 is constituted of a plastic lens L8 having a weak refracting power, the two surfaces of which are aspherical, and a field flattener lens L9, which is composed of a negative meniscus lens located such that its concave surface constituted of an aspherical surface faces the screen. The plastic lens L8 and the field flattener lens L9, which constitute the fourth lens group G4, are located in this order from the direction of the screen.

The field flattener lens L9 constitutes a liquid optical coupler, which contains a liquid LQ sealed between the field flattener lens L9 and a projection cathode-ray tube (CRT) FP.

This embodiment satisfies the condition, which is expressed as $$LC/FO > 0.47$$

wherein LC represents the distance between a surface r13 of the plastic lens L7 of the third lens group G3 and a fluorescent surface P of the CRT, and FO represents the focal length of the whole projecting lens.

When the magnification of the projecting lens is varied, the first lens group G1, the second lens group G2, and the third lens group G3 are moved different distances so as to adjust the focusing position. Axial air separations d2, d11, and d13 vary in accordance with the magnification.

This embodiment also satisfies the condition, which is expressed as $$0.1 < \phi 6/\phi O < 0.5$$

wherein $\phi 6$ represents the refracting power of the plastic lens L6 having the positive refracting power, which lens is included in the second lens group G2, and $\phi O$ represents the refracting power of the whole projecting lens.

In this embodiment, when the magnification m is −1/0.044, the focal length f is equal to 138.71 mm, and the object distance is equal to 3.354 m.

Table 1 shows the structure and characteristics of the first embodiment of the projecting lens in accordance with the present invention.

TABLE 1

|     |     | r (mm)    |     | d (mm)   | $n_e$  | νd   |
|-----|-----|-----------|-----|----------|--------|------|
| L1  | r1  | *268.60   | d1  | 9.00     | 1.4935 | 57.8 |
|     | r2  | *2802.7   | d2  | Variable |        |      |
| L2  | r3  | *−103.01  | d3  | 8.00     | 1.4935 | 57.8 |
|     | r4  | *−148.37  | d4  | 17.10    |        |      |
| L3  | r5  | 162.42    | d5  | 31.48    | 1.5914 | 61.3 |
|     | r6  | −175.57   | d6  | 6.00     | 1.8126 | 25.5 |
| L4  | r7  | ∞         | d7  | 0.90     |        |      |
| L5  | r8  | 296.50    | d8  | 12.23    | 1.5914 | 61.3 |
|     | r9  | −816.18   | d9  | 1.00     |        |      |
| L6  | r10 | 156.13    | d10 | 14.50    | 1.4935 | 57.8 |
|     | r11 | 2439.2    | d11 | Variable |        |      |
| L7  | r12 | *2986.5   | d12 | 6.00     | 1.4935 | 57.8 |
|     | r13 | *797.35   | d13 | Variable |        |      |
| L8  | r14 | *1094.7   | d14 | 6.00     | 1.4935 | 57.8 |
|     | r15 | *−1595.2  | d15 | 36.81    |        |      |
| L9  | r16 | *−60.493  | d16 | 4.00     | 1.4935 | 57.8 |
| LQ  | r17 | −155.54   | d17 | 8.00     | 1.4335 | 60.2 |
| FP  | r18 | ∞         | d18 | 6.50     | 1.5710 |      |
|     | r19 | ∞         |     |          |        |      |

Also, Table 2 shows the values of the distance d2 between the first lens group G1 and the second lens group G2, the distance d11 between the second lens group G2 and the third lens group G3, and the distance d13 between the third lens group G3 and the fourth lens group G4 at each value of the magnification m.

TABLE 2

| Magnification m | −1/0.044 | −1/0.017 | −1/0.088 |
|-----------------|----------|----------|----------|
| d2              | 23.99    | 23.76    | 24.31    |
| d11             | 32.17    | 34.14    | 35.19    |
| d13             | 17.86    | 12.28    | 23.31    |

Table 3 shows the values of the aspherical surface factors a1, a2, a3, and a4 and the values of the eccentricity k of the aspherical surfaces r1, r2, r3, r4, r12, r13, r14, r15, and r16.

TABLE 3

|     | $a_1$       | $a_2$       | $a_3$       | $a_4$       | k           |
|-----|-------------|-------------|-------------|-------------|-------------|
| r1  | −3.9373E−07 | 2.0335E−11  | −7.1896E−15 | 6.9980E−19  | 9.8474E−01  |
| r2  | −1.8762E−07 | 8.6018E−11  | −8.6059E−15 | 2.4086E−20  | 1.0000E+00  |
| r3  | 1.4514E−06  | −1.3853E−10 | 1.6091E−14  | −3.0777E−19 | 1.0000E+00  |
| r4  | 1.0968E−06  | −1.7785E−10 | 1.6292E−14  | 3.3373E−19  | 1.0000E+00  |
| r12 | 4.6467E−07  | −3.0623E−11 | −8.4663E−15 | −4.5056E−19 | 1.0000E+00  |

TABLE 3-continued

|     | $a_1$        | $a_2$        | $a_3$        | $a_4$        | k           |
|-----|--------------|--------------|--------------|--------------|-------------|
| r13 | 6.8660E−07   | −3.3349E−11  | 6.9450E−15   | −2.9246E−18  | 1.0000E+00  |
| r14 | −6.5295E−07  | 1.3049E−10   | −1.9776E−15  | 1.0655E−18   | 1.0000E+00  |
| r15 | −6.2223E−07  | 2.0188E−11   | 4.3610E−14   | −1.2237E−17  | −1.0000E+00 |
| r16 | −2.1305E−07  | 8.0566E−11   | 3.7669E−14   | −1.0525E−17  | 1.0000E+00  |

SECOND EMBODIMENT

Figure 2:
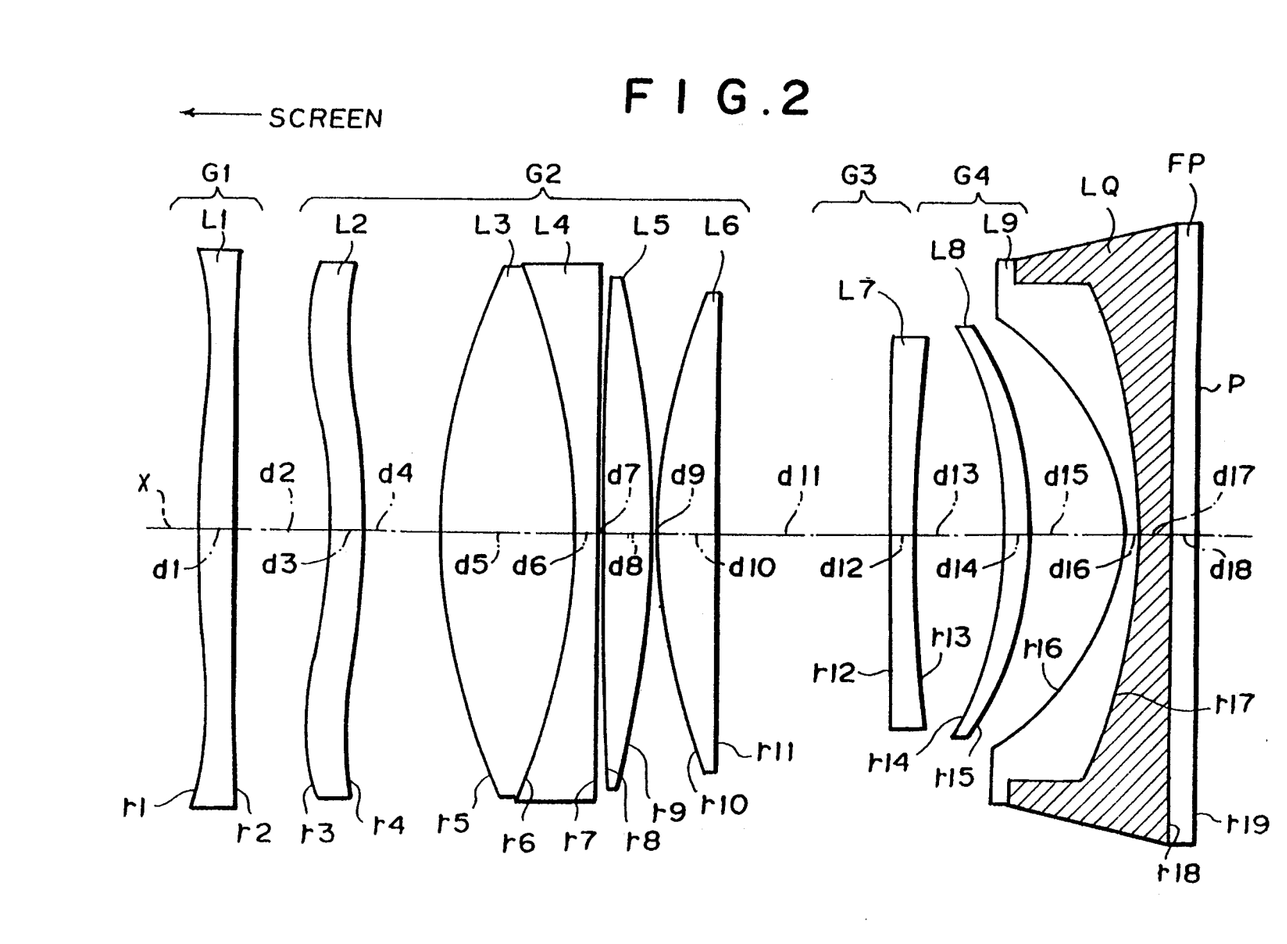
FIG. 2 is a sectional view showing a second embodiment of the projecting lens in accordance with the present invention.

A second embodiment of the projecting lens in accordance with the present invention, which is shown in FIG. 2, is constituted approximately in the same manner as that in the first embodiment, except that the values, such as the radii of curvature of the surfaces of the respective lenses, are different.

In the second embodiment, when the magnification m is −1/0.044, the focal length f is equal to 138.81 mm, and the object distance is equal to 3.351 m.

Table 4 shows the structure and characteristics of the second embodiment of the projecting lens in accordance with the present invention.

TABLE 4

|     |     | r (mm)    | d    | d (mm)    | $n_e$  | νd   |
|-----|-----|-----------|------|-----------|--------|------|
| L1  | r1  | *288.62   | d1   | 9.00      | 1.4935 | 57.8 |
|     | r2  | *∞        | d2   | Variable  |        |      |
| L2  | r3  | *−103.01  | d3   | 8.00      | 1.4935 | 57.8 |
|     | r4  | *−148.37  | d4   | 18.42     |        |      |
| L3  | r5  | 154.26    | d5   | 32.50     | 1.5914 | 61.3 |
|     | r6  | −173.26   | d6   | 6.00      | 1.8126 | 25.5 |
| L4  | r7  | ∞         | d7   | 0.90      |        |      |
| L5  | r8  | 1629.2    | d8   | 12.26     | 1.5914 | 61.3 |
|     | r9  | −250.99   | d9   | 1.00      |        |      |
| L6  | r10 | 156.13    | d10  | 14.50     | 1.4935 | 57.8 |
|     | r11 | 2439.2    | d11  | Variable  |        |      |
| L7  | r12 | *2986.5   | d12  | 6.00      | 1.4935 | 57.8 |
|     | r13 | *797.35   | d13  | Variable  |        |      |
| L8  | r14 | *−162.39  | d14  | 6.00      | 1.4935 | 57.8 |
|     | r15 | *−137.47  | d15  | 21.81     |        |      |
| L9  | r16 | *−61.960  | d16  | 4.00      | 1.4935 | 57.8 |
|     | r17 | *−157.50  | d17  | 8.00      | 1.4335 | 60.2 |
| LQ  | r18 | ∞         | d18  | 6.50      | 1.571  |      |
| FP  | r19 | ∞         |      |           |        |      |

Also, Table 5 shows the values of the distance d2 between the first lens group G1 and the second lens group G2, the distance d11 between the second lens group G2 and the third lens group G3, and the distance d13 between the third lens group G3 and the fourth lens group G4 at each value of the magnification m.

TABLE 5

| Magnification m | −1/0.044 | −1/0.017 | −1/0.088 |
|-----------------|----------|----------|----------|
| d2              | 22.67    | 22.31    | 23.20    |
| d11             | 42.33    | 44.53    | 38.14    |
| d13             | 21.64    | 16.19    | 31.03    |

Table 6 shows the values of the aspherical surface factors a1, a2, a3, and a4 and the values of the eccentricity k of the aspherical surfaces r1, r2, r3, r4, r12, r13, r14, r15, and r16.

TABLE 6

|     | $a_1$       | $a_2$        | $a_3$        | $a_4$        | k           |
|-----|-------------|--------------|--------------|--------------|-------------|
| r1  | −4.0780E−07 | 1.8920E−11   | −7.2468E−15  | 6.9520E−19   | 9.8412E−01  |
| r2  | −2.0298E−07 | 8.1630E−11   | −8.2270E−15  | 3.8429E−20   | 1.0000E+00  |
| r3  | 1.3638E−06  | −1.2895E−10  | 1.5985E−14   | −3.1051E−19  | 1.0000E+00  |
| r4  | 1.0636E−06  | −1.7036E−10  | 1.6651E−14   | 3.3942E−19   | 1.0000E+00  |
| r12 | 5.2807E−08  | −1.9257E−11  | −8.1485E−15  | −4.4677E−19  | 1.0000E+00  |
| r13 | 2.7273E−07  | −4.2436E−11  | 6.7450E−15   | −2.9272E−18  | 1.0000E+00  |
| r14 | −8.8330E−07 | 1.1959E−10   | −2.0161E−15  | 1.0666E−18   | 1.0000E+00  |
| r15 | −8.8643E−07 | 3.0367E−11   | 4.3705E−14   | −1.2237E−17  | 1.0000E+00  |
| r16 | −3.1512E−07 | 7.5582E−11   | 3.7620E−14   | −1.0525E−17  | 1.0000E+00  |

THIRD EMBODIMENT

Figure 3:
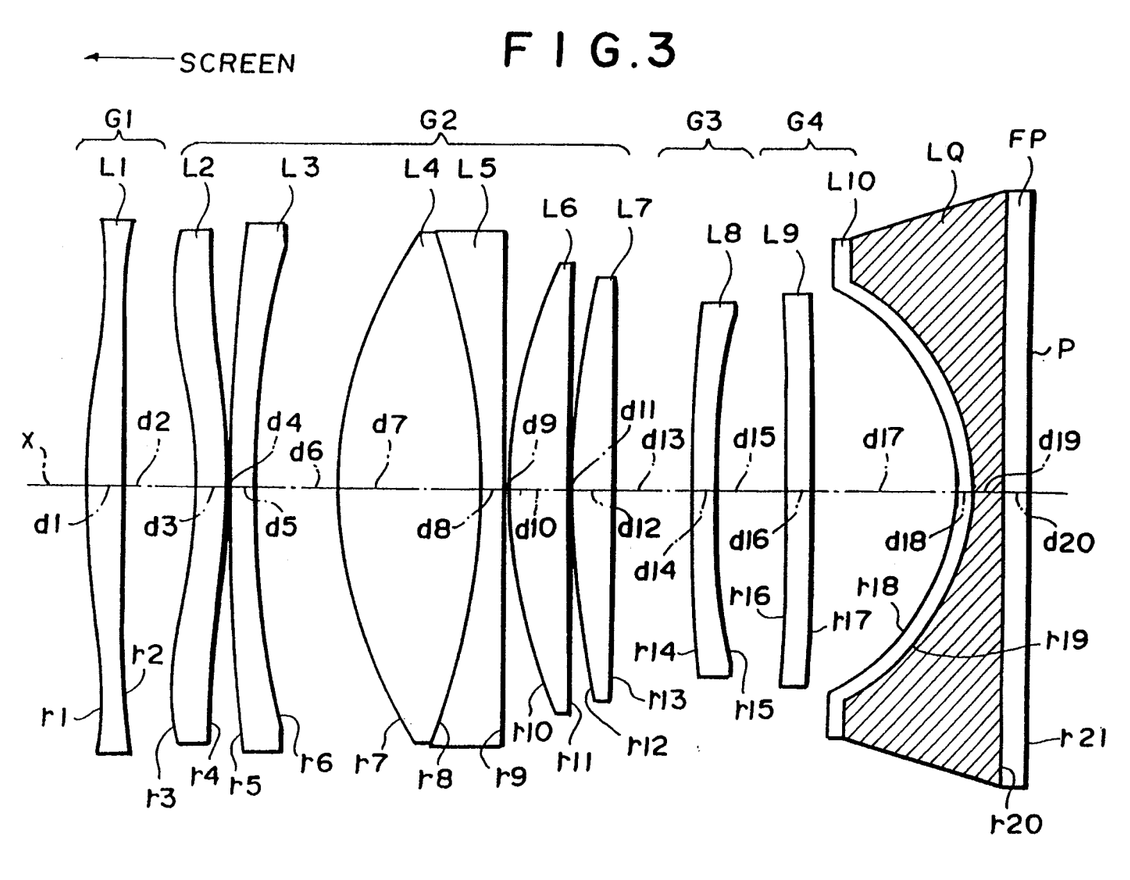
FIG. 3 is a sectional view showing a third embodiment of the projecting lens in accordance with the present invention.

A third embodiment of the projecting lens in accordance with the present invention, which is shown in FIG. 3, is constituted approximately in the same manner as that in the first embodiment, except that the achromatic lens system in the second lens group G2 is constituted of five lenses L3, L4, L5, L6, and L7, except that the lens L7, which is closest to the CRT among the lenses constituting the second lens group G2, is a planoconvex lens located with its convex surface facing the direction of the screen, and except that the values, such as the radii of curvature of the surfaces of the respective lenses, are different.

In the third embodiment, when the magnification m is −1/0.043, the focal length f is equal to 133.35 mm, and the object distance is equal to 3.275 m.

Table 7 shows the structure and characteristics of the third embodiment of the projecting lens in accordance with the present invention.

TABLE 7

|     |     | r (mm)    | d    | d (mm)    | $n_e$  | νd   |
|-----|-----|-----------|------|-----------|--------|------|
| L1  | r1  | *201.41   | d1   | 9.00      | 1.4922 | 57.8 |
|     | r2  | *2800.2   | d2   | Variable  |        |      |
| L2  | r3  | *−107.20  | d3   | 8.00      | 1.4922 | 57.8 |
|     | r4  | *−157.22  | d4   | 0.50      |        |      |
| L3  | r5  | 700.03    | d5   | 6.00      | 1.6241 | 36.4 |
|     | r6  | 278.34    | d6   | 21.58     |        |      |
| L4  | r7  | 121.22    | d7   | 36.41     | 1.5914 | 61.3 |
|     | r8  | −182.59   | d8   | 6.00      | 1.8126 | 25.5 |
| L5  | r9  | −4984.4   | d9   | 0.90      |        |      |
| L6  | r10 | 141.50    | d10  | 15.49     | 1.5914 | 61.3 |
|     | r11 | 2555.6    | d11  | 1.00      |        |      |
| L7  | r12 | 268.54    | d12  | 10.05     | 1.4922 | 57.8 |
|     | r13 | ∞         | d13  | Variable  |        |      |
| L8  | r14 | *−7823.1  | d14  | 6.00      | 1.4922 | 57.8 |
|     | r15 | *−1269.4  | d15  | Variable  |        |      |
| L9  | r16 | *861.06   | d16  | 6.00      | 1.4922 | 57.8 |
|     | r17 | *746.13   | d17  | 36.89     |        |      |
| L10 | r18 | *−58.086  | d18  | 4.00      | 1.4922 | 57.8 |
|     | r19 | −63.635   | d19  | 8.00      | 1.4447 | 60.2 |
| LQ  | r20 | ∞         | d20  | 6.50      | 1.5713 |      |
| FP  | r21 | ∞         |      |           |        |      |

Also, Table 8 shows the values of the distance d2 between the first lens group G1 and the second lens group G2, the distance d13 between the second lens group G2 and the third lens group G3, and the distance d15 between the third lens group G3 and the fourth lens group G4 at each value of the magnification m.

TABLE 8

| Magnification m | −1/0.043 | −1/0.017 | −1/0.086 |
|---|---|---|---|
| d2 | 19.01 | 18.73 | 19.25 |
| d13 | 20.03 | 22.12 | 17.18 |
| d15 | 17.81 | 12.92 | 25.41 |

Table 9 shows the values of the aspherical surface factors a1, a2, a3, and a4 and the values of the eccentricity k of the aspherical surfaces r1, r2, r3, r4, r14, r15, r16, r17, and r18.

TABLE 9

|  | $a_1$ | $a_2$ | $a_3$ | $a_4$ | k |
|---|---|---|---|---|---|
| r1 | −2.9602E−07 | −1.9292E−11 | −4.0466E−15 | 8.8136E−19 | 1.0000E+00 |
| r2 | −1.1035E−07 | 3.2460E−11 | −4.6651E−16 | 1.8105E−19 | 1.0000E+00 |
| r3 | 1.2609E−06 | −1.4992E−10 | 1.9801E−14 | −3.8291E−19 | 1.0000E+00 |
| r4 | 9.7736E−07 | −1.8179E−10 | 1.4830E−14 | 4.9897E−19 | 1.0000E+00 |
| r14 | 5.3436E−07 | −5.4461E−11 | −8.7274E−15 | −4.5432E−19 | 1.0000E+00 |
| r15 | 8.0450E−07 | −3.9599E−11 | 6.4848E−15 | −2.9288E−18 | 1.0000E+00 |
| r16 | −7.3327E−07 | 1.3672E−10 | −1.4779E−15 | 1.0596E−18 | 1.0000E+00 |
| r17 | −4.9779E−07 | 6.3455E−11 | 4.3503E−14 | −1.2229E−17 | 1.0000E+00 |
| r18 | 7.4894E−08 | 7.4215E−11 | 3.7655E−14 | −1.0526E−17 | 1.0000E+00 |

FOURTH EMBODIMENT

Figure 4:
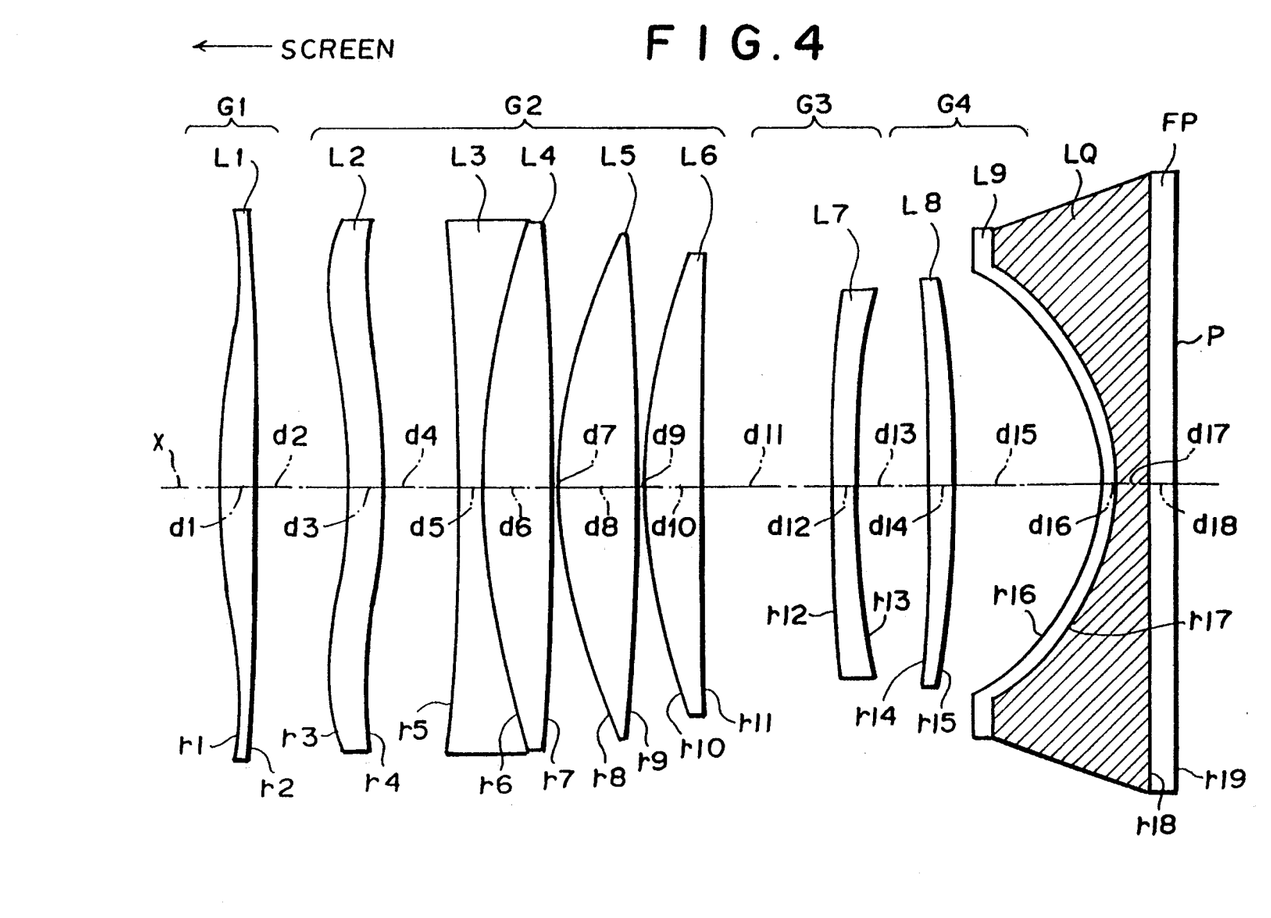
FIG. 4 is a sectional view showing a fourth embodiment of the projecting lens in accordance with the present invention.

A fourth embodiment of the projecting lens in accordance with the present invention, which is shown in FIG. 4, is constituted approximately in the same manner as that in the first embodiment, except that the values, such as the radii of curvature of the surfaces of the respective lenses, are different.

In the fourth embodiment, when the magnification m is −1/0.044, the focal length f is equal to 139.87 mm, and the object distance is equal to 3.350 m.

Table 10 shows the structure and characteristics of the fourth embodiment of the projecting lens in accordance with the present invention.

TABLE 10

|  |  | r (mm) |  | d (mm) | $n_e$ | νd |
|---|---|---|---|---|---|---|
| L1 | r1 | *179.71 | d1 | 9.00 | 1.4935 | 57.8 |
|  | r2 | *−1416.9 | d2 | Variable |  |  |
| L2 | r3 | *−103.01 | d3 | 8.00 | 1.4935 | 57.8 |
|  | r4 | *−148.37 | d4 | 18.42 |  |  |
| L3 | r5 | −836.09 | d5 | 6.00 | 1.8126 | 25.5 |
|  | r6 | 205.27 | d6 | 17.74 | 1.5914 | 61.3 |
| L4 | r7 | −883.78 | d7 | 0.90 |  |  |
| L5 | r8 | 137.81 | d8 | 20.17 | 1.5914 | 61.3 |
|  | r9 | −637.23 | d9 | 1.00 |  |  |
| L6 | r10 | 156.13 | d10 | 14.50 | 1.4935 | 57.8 |
|  | r11 | 2439.2 | d11 | Variable |  |  |
| L7 | r12 | *2986.5 | d12 | 6.00 | 1.4935 | 57.8 |
|  | r13 | *797.35 | d13 | Variable |  |  |
| L8 | r14 | *−13879 | d14 | 6.00 | 1.4935 | 57.8 |
|  | r15 | *−1017.1 | d15 | 36.58 |  |  |
| L9 | r16 | *−59.545 | d16 | 4.00 | 1.4935 | 57.8 |
| LQ | r17 | −62.587 | d17 | 8.00 | 1.4335 | 60.2 |

TABLE 10-continued

|  |  | r (mm) | d (mm) | $n_e$ | νd |
|---|---|---|---|---|---|
|  | r18 | ∞ | d18 | 6.50 | 1.5710 |
| FP | r19 | ∞ |  |  |  |

Also, Table 11 shows the values of the distance d2 between the first lens group G1 and the second lens group G2, the distance d11 between the second lens group G2 and the third lens group G3, and the distance d13 between the third lens group G3 and the fourth lens group G4 at each value of the magnification m.

TABLE 11

| Magnification m | −1/0.044 | −1/0.017 | −1/0.088 |
|---|---|---|---|
| d2 | 22.67 | 22.43 | 22.89 |
| d11 | 31.46 | 33.66 | 28.67 |
| d13 | 17.86 | 12.16 | 25.89 |

Table 12 shows the values of the aspherical surface factors a1, a2, a3, and a4 and the values of the eccentricity k of the aspherical surfaces r1, r2, r3, r12, r13, r14, r15, and r16.

TABLE 12

|  | $a_1$ | $a_2$ | $a_3$ | $a_4$ | k |
|---|---|---|---|---|---|
| r1 | −3.7946E−07 | 5.5088E−12 | −7.2570E−15 | 6.9096E−19 | 9.7547E−01 |
| r2 | −1.7894E−07 | 7.6741E−11 | −8.7384E−15 | 3.0338E−20 | 1.0000E+00 |
| r3 | 1.5134E−06 | −1.4667E−10 | 1.5732E−14 | −3.1840E−19 | 1.0000E+00 |
| r4 | 1.1665E−06 | −1.9316E−10 | 1.6418E−14 | 3.4118E−19 | 1.0000E+00 |
| r12 | 3.9724E−07 | −3.2810E−11 | −8.3365E−15 | −4.4829E−19 | 1.0000E+00 |
| r13 | 6.0639E−07 | −2.6792E−11 | 6.9682E−15 | −2.9251E−18 | 1.0000E+00 |
| r14 | −6.0736E−07 | 1.2929E−10 | −1.9906E−15 | 1.0659E−18 | 1.0000E+00 |
| r15 | −4.8753E−07 | 2.2583E−11 | 4.3630E−14 | −1.2237E−17 | 1.0000E+00 |
| r16 | −2.1894E−07 | 7.8870E−11 | 3.7675E−14 | −1.0525E−17 | 1.0000E+00 |

FIFTH EMBODIMENT

Figure 5:
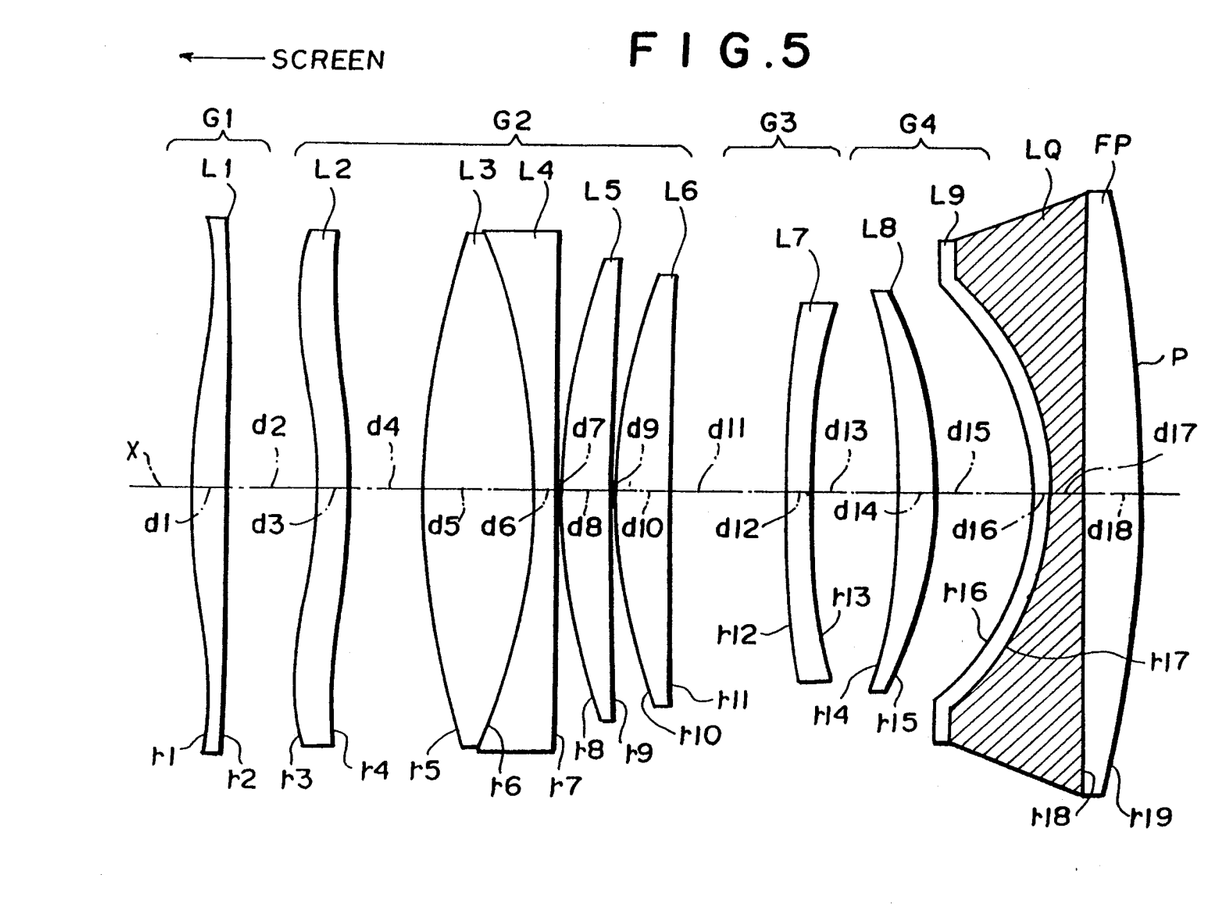
FIG. 5 is a sectional view showing a fifth embodiment of the projecting lens in accordance with the present invention.
Figure 6A:
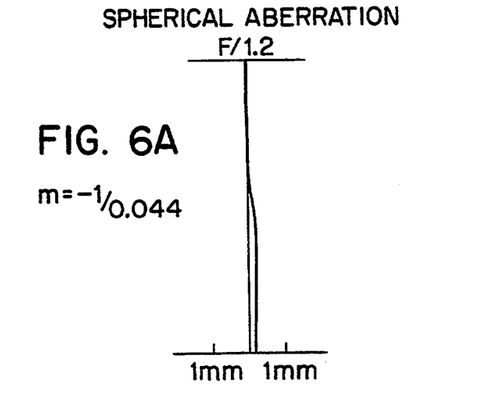
FIGS. 6A–6F are diagrams showing the aberrations of the first embodiment of the projecting lens in accordance with the present invention.
Figure 6B:
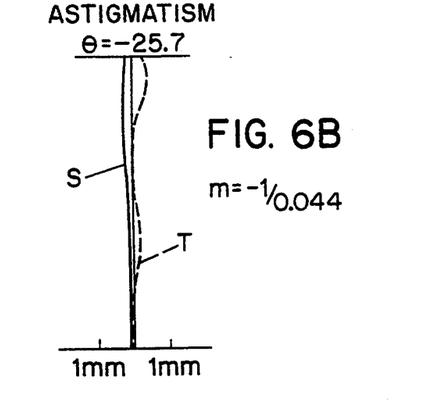
Figure 6C:
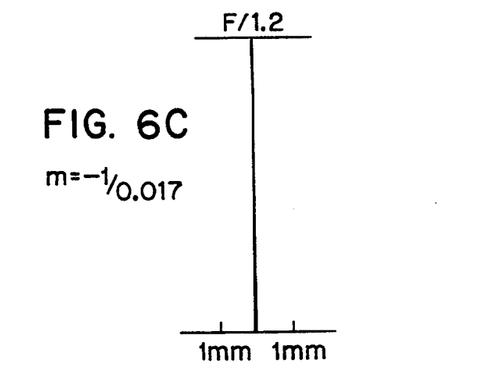
Figure 6D:
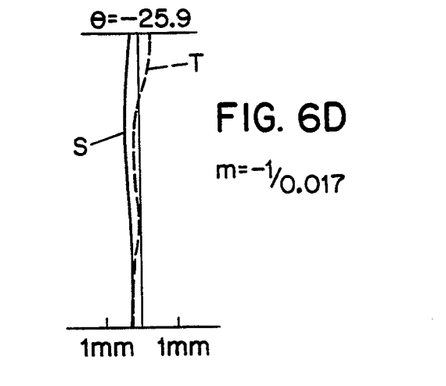
Figure 6E:
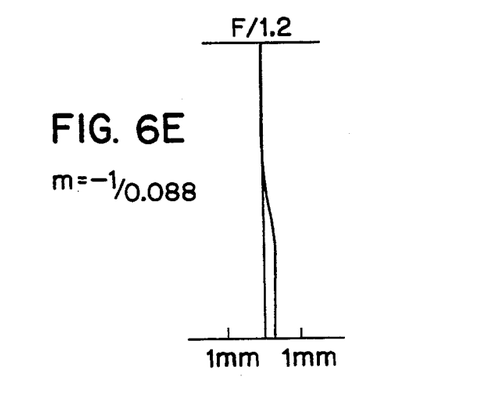
Figure 6F:
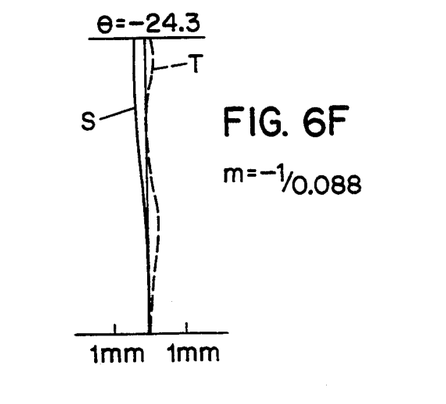
Figure 7A:
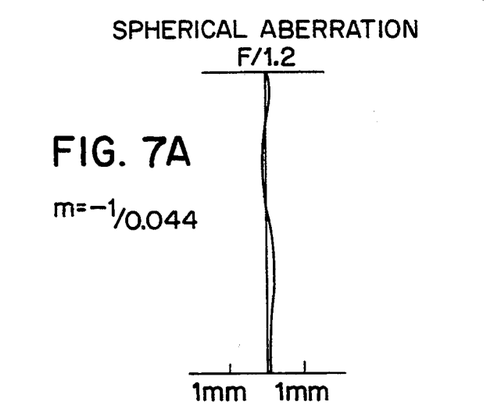
FIGS. 7A–7F are diagrams showing the aberrations of the second embodiment of the projecting lens in accordance with the present invention.
Figure 7B:
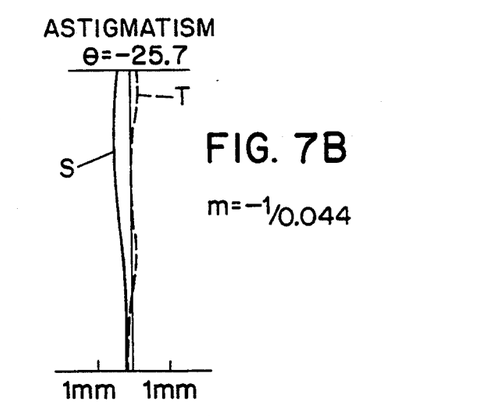
Figure 7C:
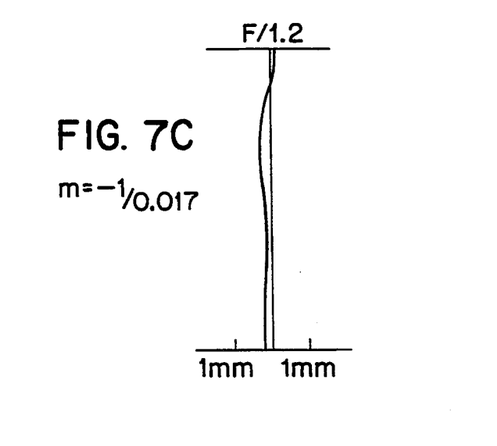
Figure 7D:
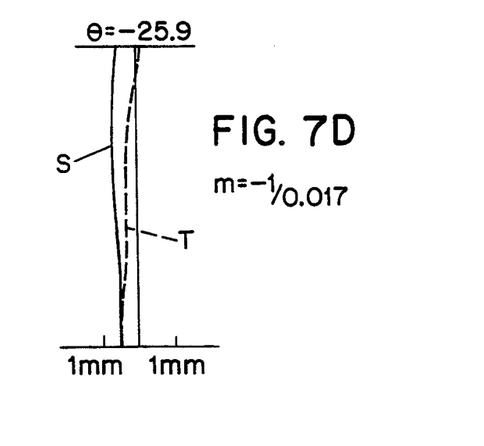
Figure 7E:
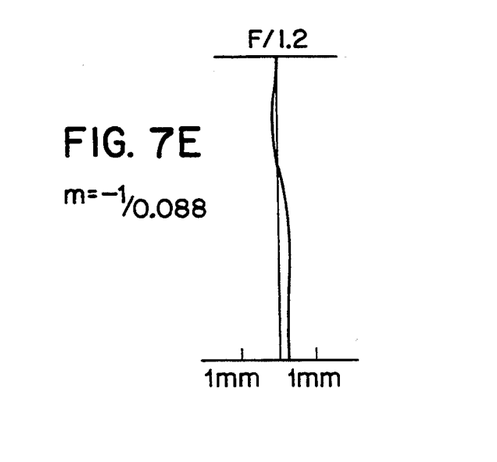
Figure 7F:
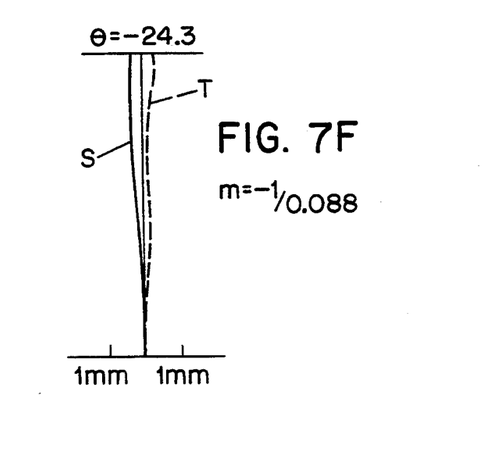
Figure 8A:
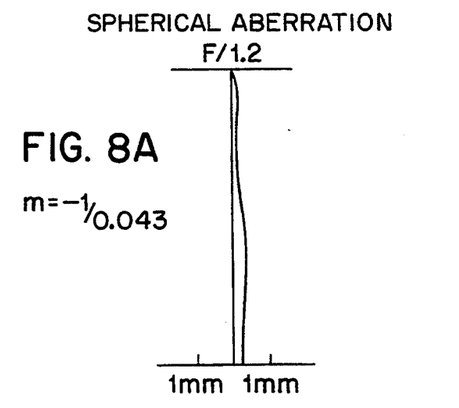
FIGS. 8A–8F are diagrams showing the aberrations of the third embodiment of the projecting lens in accordance with the present invention.
Figure 8B:
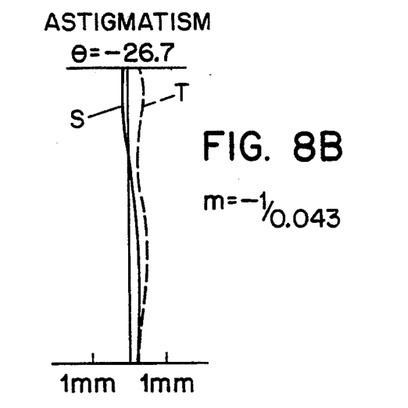
Figure 8C:
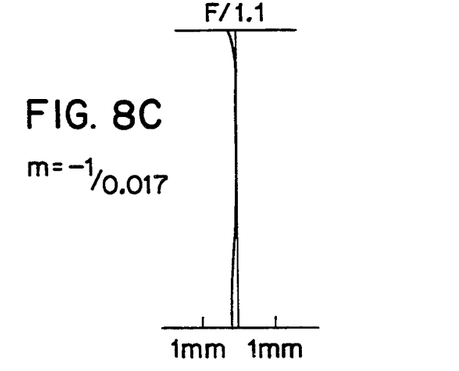
Figure 8D:
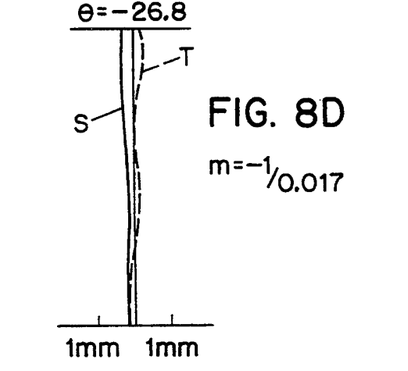
Figure 8E:
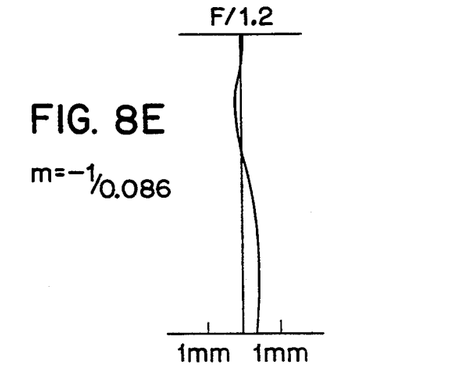
Figure 8F:
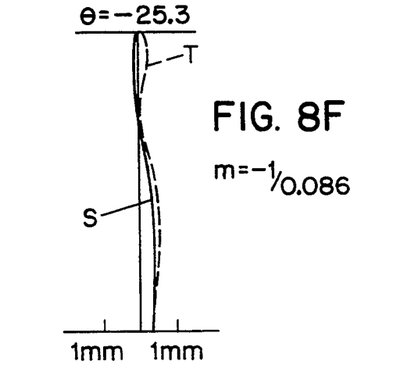
Figure 9A:
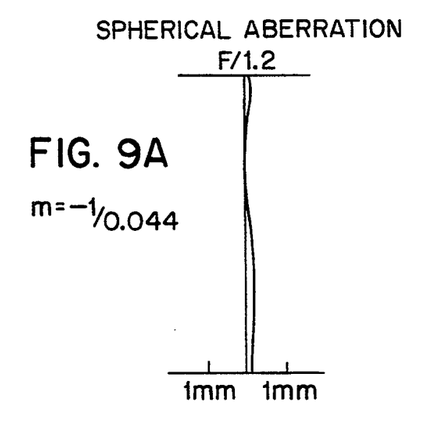
FIGS. 9A–9F are diagrams showing the aberrations of the fourth embodiment of the projecting lens in accordance with the present invention.
Figure 9B:
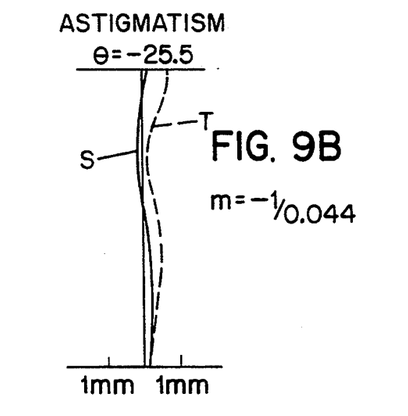
Figure 9C:
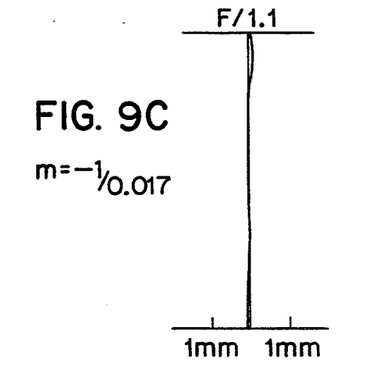
Figure 9D:
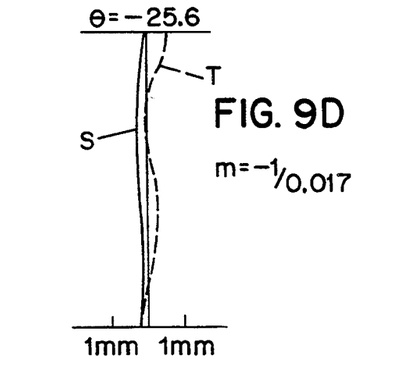
Figure 9E:
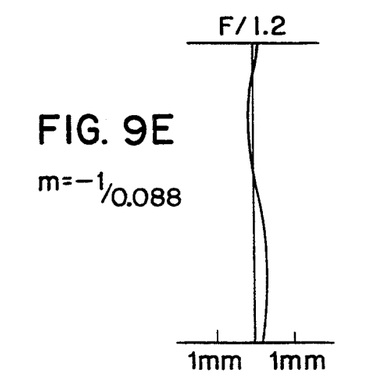
Figure 9F:
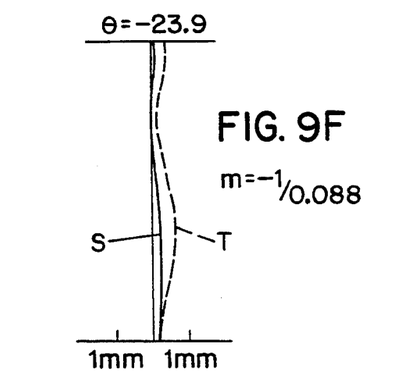
Figure 10A:
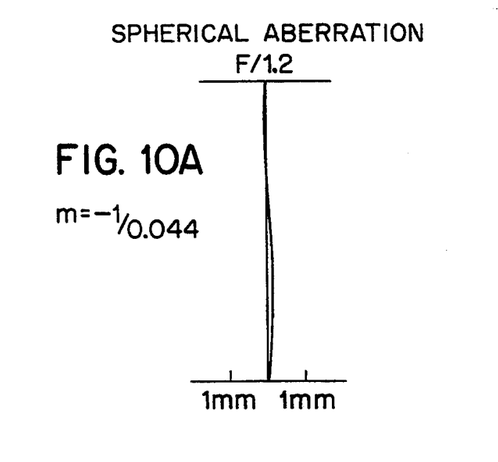
FIGS. 10A–10F are diagrams showing the aberrations of the fifth embodiment of the projecting lens in accordance with the present invention.
Figure 10B:
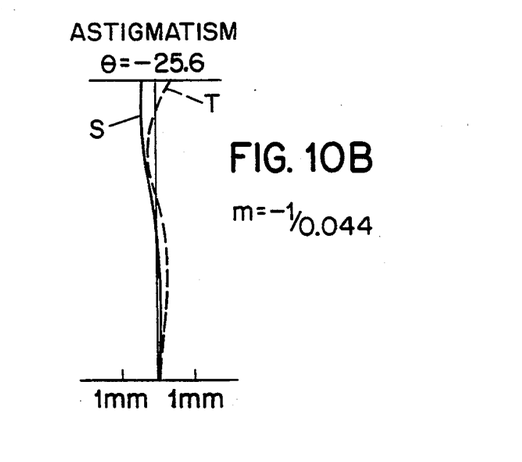
Figure 10C:
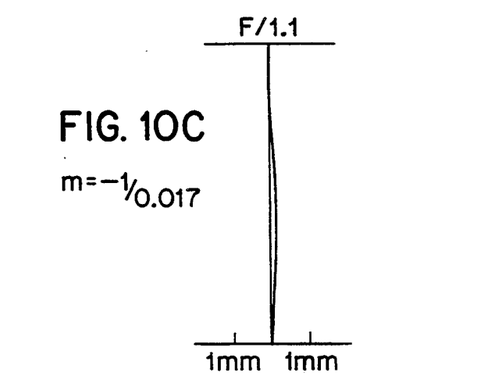
Figure 10D:
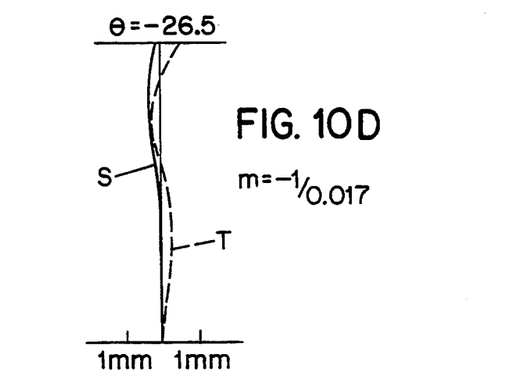
Figure 10E:
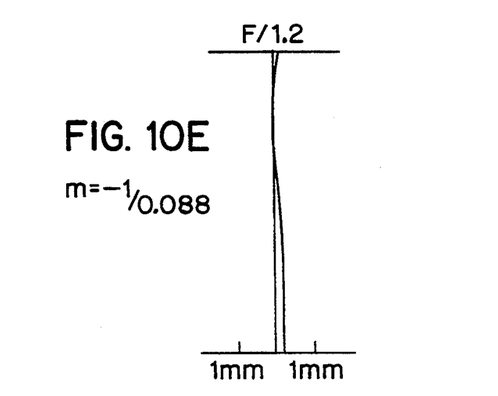
Figure 10F:
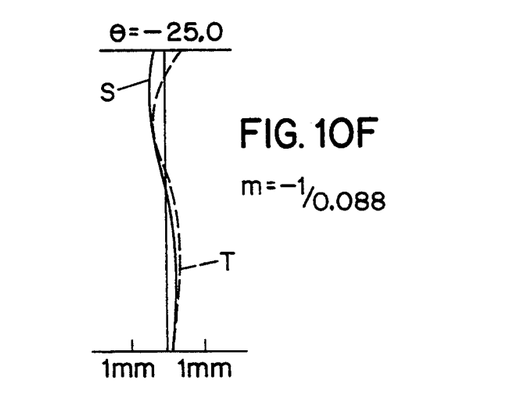

A fifth embodiment of the projecting lens in accordance with the present invention, which is shown in FIG. 5, is constituted approximately in the same manner as that in the first embodiment, except that the fluorescent surface P of the CRT is curved, and except that the values, such as the radii of curvature of the surfaces of the respective lenses, are different.

In the fifth embodiment, when the magnification m is −1/0.044, the focal length f is equal to 140.61 mm, and the object distance is equal to 3.358 m.

Table 13 shows the structure and characteristics of the fifth embodiment of the projecting lens in accordance with the present invention.

TABLE 13

|  |  | r (mm) |  | d (mm) | $n_e$ | νd |
|---|---|---|---|---|---|---|
| L1 | r1 | *176.22 | d1 | 9.00 | 1.4935 | 57.8 |
|  | r2 | *2799.9 | d2 | Variable |  |  |
| L2 | r3 | *−103.01 | d3 | 8.00 | 1.4935 | 57.8 |

TABLE 13-continued

| | | r (mm) | | d (mm) | $n_e$ | $\nu d$ |
|---|---|---|---|---|---|---|
| | r4 | *−148.37 | d4 | 18.27 | | |
| L3 | r5 | 216.63 | d5 | 27.95 | 1.5914 | 61.3 |
| | r6 | −172.49 | d6 | 6.00 | 1.8126 | 25.5 |
| L4 | r7 | ∞ | d7 | 0.90 | | |
| L5 | r8 | 179.92 | d8 | 12.44 | 1.5914 | 61.3 |
| | r9 | 1041.6 | d9 | 1.00 | | |
| L6 | r10 | 156.13 | d10 | 14.50 | 1.4935 | 57.8 |
| | r11 | 2439.2 | d11 | Variable | | |
| L7 | r12 | *2986.5 | d12 | 6.00 | 1.4935 | 57.8 |
| | r13 | *797.35 | d13 | Variable | | |
| L8 | r14 | *−480.76 | d14 | 10.00 | 1.4935 | 57.8 |
| | r15 | *−146.80 | d15 | 24.61 | | |
| L9 | r16 | *−63.599 | d16 | 4.00 | 1.4935 | 57.8 |
| | r17 | −75.747 | d17 | 8.00 | 1.4335 | 60.2 |
| LQ | r18 | ∞ | d18 | 14.60 | 1.5710 | |
| FP | r19 | −350.00 | | | | |

Also, Table 14 shows the values of the distance d2 between the first lens group G1 and the second lens group G2, the distance d11 between the second lens group G2 and the third lens group G3, and the distance d13 between the third lens group G3 and the fourth lens group G4 at each value of the magnification m.

TABLE 14

| Magnification m | −1/0.044 | −1/0.017 | −1/0.088 |
|---|---|---|---|
| d2 | 22.82 | 22.76 | 22.98 |
| d11 | 28.81 | 31.01 | 26.02 |
| d13 | 21.64 | 15.54 | 30.76 |

Table 15 shows the values of the aspherical surface factors a1, a2, a3, and a4 and the values of the eccentricity k of the aspherical surfaces r1, r2, r3, r4, r12, r13, r14, r15, and r16.

TABLE 15

| | $a_1$ | $a_2$ | $a_3$ | $a_4$ | k |
|---|---|---|---|---|---|
| r1 | −3.9035E−07 | 4.3519E−12 | −6.9038E−15 | 7.0046E−19 | 7.2647E−01 |
| r2 | −2.6907E−07 | 8.1278E−11 | −8.6071E−15 | 2.9377E−20 | 1.0000E+00 |
| r3 | 1.4216E−06 | −1.3872E−10 | 1.5685E−14 | −3.2133E−19 | 1.0000E+00 |
| r4 | 1.1154E−06 | −1.9452E−10 | 1.6481E−14 | 3.4424E−19 | 1.0000E+00 |
| r12 | 5.6792E−07 | −1.3731E−11 | −8.5806E−15 | −4.5579E−19 | 1.0000E+00 |
| r13 | 8.3448E−07 | −3.3387E−11 | 7.1912E−15 | −2.9191E−18 | 1.0000E+00 |
| r14 | −7.6415E−07 | 7.7377E−11 | −2.5113E−15 | 1.0639E−18 | 1.0000E+00 |
| r15 | −7.0761E−07 | 6.8636E−11 | 4.4181E−14 | −1.2234E−17 | 1.0000E+00 |
| r16 | 4.5407E−07 | 4.7203E−11 | 3.7274E−14 | −1.0528E−17 | 1.0000E+00 |

FIGS. 6A–F, 7A–F, 8A–F, 9A–F, and 10A–F show the spherical aberration and the astigmatism of the first, second, third, fourth, and fifth embodiments described above. In each of these aberration diagrams, states of each aberration for the three values of the magnification shown in each of Table 2, Table 5, Table 8, Table 11, and Table 14 are illustrated.

From these aberration diagrams, it is clear that, in every embodiment of the projecting lens in accordance with the present invention, good optical performance is kept over the wide variable power range.

The structure of the projecting lens in accordance with the present invention is not limited to those of the five embodiments described above. For example, the curvatures of the lenses constituting each lens set, or the like, may be changed within the scope defined in the present invention. Also, at least on surface of the lens, which is located closest to the projection cathode-ray tube among the lenses constituting the second-set lens, may be aspherical. In such cases, the same effects as those of the embodiments described above can be obtained.

What is claimed is:

1. A projection lens for projecting an image which has been formed on a projection cathode-ray tube onto a screen comprising:

(i) a first lens group comprising a positive plastic lens having a weak refracting power, at least one surface of which lens is aspherical, (ii) a second lens group comprising:
(a) a plastic lens having a weak refracting power with at least one aspherical surface, and
(b) an achromatic lens system having a substantial effect on the refracting power of the whole projection lens, the achromatic lens system comprising at least three glass lenses and a plastic lens having a positive refracting power, at least one surface of the positive refracting power plastic lens being aspherical, said weak refracting power plastic lens and said achromatic lens system being located in this order from the direction of the screen, (iii) a third lens group comprising a further plastic lens having a weak refracting power with at least one aspherical surface, and (vi) a fourth lens group comprising an additional plastic lens with at least one aspherical surface and a field flattener lens having a concave surface facing the screen, said additional plastic lens and said field flattener lens of said fourth lens group being located in this order from the direction of the screen, said first lens group, said second lens group, said third lens group and said fourth lens group being located in this order from the direction of the screen, said field flattener lens constituting a liquid optical coupler which contains a liquid sealed between said field flattener lens and the projection cathode-ray tube, the position of the plastic lens of the third lens group satisfying the condition:

$LC/FO > 0.47$ wherein LC represents the distance between the surface of said plastic lens of said third lens group facing the projection cathode-ray tube and a fluorescent surface of the projection cathode-ray tube and FO represents the focal length of the whole projection lens, when the magnification of the projection lens is varied, said first lens group, said second lens group and said third lens group being moved different distances so as to adjust a focusing position, the refracting power of the positive plastic lens in the second lens group satisfying the condition:

$$0.1 < \phi T/\phi O < 0.5$$

wherein $\phi T$ represents the refracting power of said plastic lens having the positive refracting power in said second lens group and $\phi O$ represents the refracting power of the whole projection lens.

2. A projection lens as defined in claim 1 wherein said achromatic lens system has a refracting power at least approximately one-half the refracting power of the whole projection lens.

3. A projection lens as defined in claim 1 wherein, during the movements of said second lens group and said third lens group, the relationship between the position of said second lens group and the position of said third lens group is set to be a predetermined relationship in accordance with their movements.

4. A projection lens as defined in claim 1 wherein said achromatic lens system of said second lens group comprises a combination of convex, concave, convex and convex lens surfaces located in this order from the direction of the screen.

5. A projection lens as defined in claim 1 wherein said achromatic lens system of said second lens group comprises a combination of concave, convex, concave, convex and convex lens surfaces located in this order from the direction of the screen.

6. A projection lens as defined in claim 1 wherein said achromatic lens system of said second lens group comprises a combination of concave, convex, convex and convex lens surfaces located in this order from the direction of the screen.

* * * * *

UNITED STATES PATENT AND TRADEMARK OFFICE
CERTIFICATE OF CORRECTION

PATENT NO. : 5,367,405
DATED : November 22, 1994
INVENTOR(S) : Kenzo Sado

It is certified that error appears in the above-identified patent and that said Letters Patent is hereby corrected as shown below:

<u>Title page, Item [57], Abstract, line 1</u>: The words "set lenses" should read --lens groups--.

<u>Column 2, line 57</u>: The words "constituted of" should read --including--.

<u>Column 3, line 3</u>: The words "constituted of" should read --including--; <u>line 15</u>: The word "side" should read --direction--.

<u>Column 4, line 23</u>: The words "its image quality at the" should read --the image quality at its--.

<u>Column 12, line 35</u>: The word "r3" should read --r3, r4,--.

<u>Column 13, line 67</u>: The words "second-set lens" should read --second lens group--.

Signed and Sealed this

Eighteenth Day of April, 1995

Attest:

BRUCE LEHMAN

Attesting Officer

*Commissioner of Patents and Trademarks*